Feb. 17, 1931.   A. E. FANAN   1,793,072
FLOWER POT LIFTING RING
Filed Feb. 15, 1928

Author E. Fanan Inventor:
By his Attorney
W. P. Preble

Patented Feb. 17, 1931

1,793,072

UNITED STATES PATENT OFFICE

ARTHUR E. FANAN, OF ELMHURST, NEW YORK

FLOWERPOT-LIFTING RING

Application filed February 15, 1928. Serial No. 254,332.

It has been found by persons who keep decorative or other plants or flowers in jardinières; and earthen pot being closely inserted with the jardinière practically out of sight, that it is quite difficult to remove the earthen flower pot from the jardinière without breaking, spilling or injury to the plant.

The object of my invention therefore, is to provide a light, durable, easily applied and removed and inconspicuous lifting device preferably in the form of an adjustable ring which encompasses the flower pot in such a manner that its effective periphery is not enlarged and by which the flower pot can be as readily inserted in the jardinière as if it were not surrounded by the lifting ring and can be very readily removed from the jardinière without scratching; a thing which is practically impossible in the case of a close fitting flower pot without a suitable lifting device.

The preferred type of my invention is shown in the accompanying drawing in which Figure 1 is a top plan of the lifting device.

Same letter indicate similar parts in the different figures.

A represents a flower pot of usual construction having an enlarged rim B. C is an adjustable split ring preferably of metal or other somewhat flexible material of acceptable size, shape or ornamentation and adapted to be sprung around the lower portion of the flower pot and be slipped upwardly until a firm grip is obtained on the body of the flower pot. This adjustable ring may be made adjustable either by relying upon the springiness of the material of which the ring is made and the overlapping of the meeting ends of the ring so that when the open ring is snapped around the outside of the flower pot it will hold with sufficient force to permit the lifting operation; or the overlapping ends of the ring (whether of spring material or not) may preferably be supplied with co-ordinate apertures $a, a$ through one or more of which the fastening device $b$ is inserted when the overlapping apertures are brought to the positions which secure the proper circumference for the closed ring. This proper circumference may be determined at pleasure somewhere between the smaller circumference of the lower end of the flower pot and the larger circumference immediately under the overlapping rim so that if the adjustable ring is adjusted, which would usually be the case, before association with the flower pot it is put on from bottom and slipped upward. The structure is such, however, that if preferred, the ring may be applied and adjusted around the flower pot at any desired height.

Figure 1:
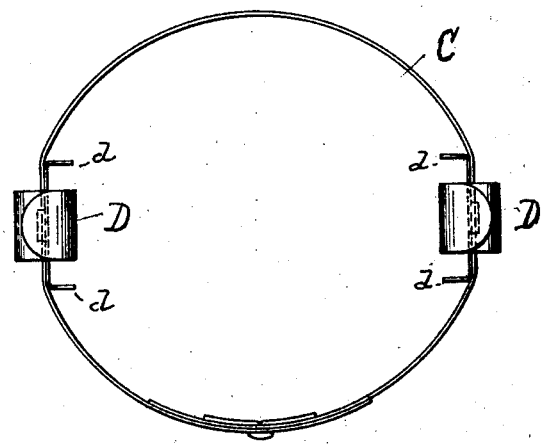
Figure 3:
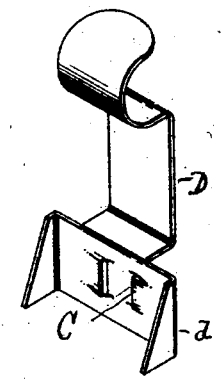
Figure 3 is a detailed and perspective of one of the lifting handles.
Figure 2:
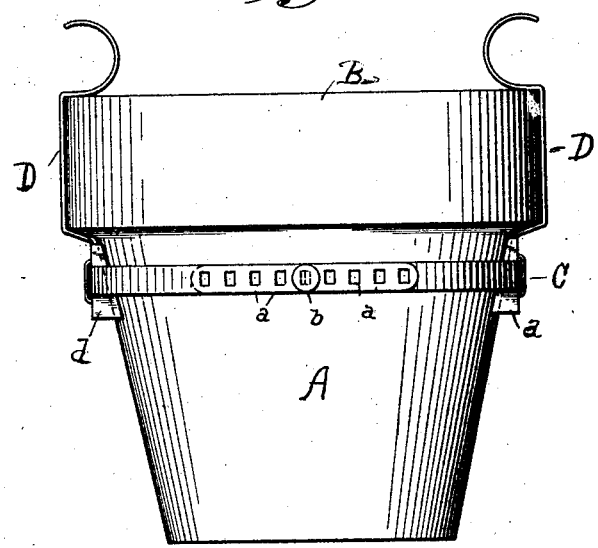
Figure 2 is a side elevation showing the lifting device associated with a flower pot.

D, D, are the lifting handles, preferably made of springy material so that when applied to the flower pot as shown in Figure 2 they exert an inwardly directed pressure by which they cling tightly to the outer surface of the enlarged portion of the flower pot. These spring handles are preferably provided with apertures $c, c$ through which the ring C is passed before adjustment is made and by reason of said apertures the handles can be slipped along the ring after adjustment to the flower pot as may be required to secure a perfect balance of the flower pot and its contents according to their shape and weight. It is also desirable that the lower end of the spring handles should be equipped with offset lugs $d, d$ so that the ring applied to a slanting surface may exert its upward pull vertically instead of at an angle.

The use and advantages of my flower pot lifting ring will, I think, be easily understood without further explanation.

I claim:

A flower-pot lifting device adapted to aid in the insertion and removal of potted flowers in a jardinière or similar holder, which consists of an adjustable ring which encompasses the flower-pot below its rim and is provided with coordinate apertures adapted to overlap each other; a fastener, adapted to pass through said apertures when overlapped and slidable lifting handles provided with off-set lugs adapted to be adjusted along the ring at such points as may be required to secure a proper balance of the flower-pot to be held therein.

ARTHUR E. FANAN.